United States Patent [19]

Koga

[11] Patent Number: 4,982,284

[45] Date of Patent: Jan. 1, 1991

[54] VIDEO SIGNAL DECODING SYSTEM HAVING A FRAME SYNCHRONIZER FUNCTION

[75] Inventor: Toshio Koga, Tokyo, Japan

[73] Assignee: NEC Corporation, Japan

[21] Appl. No.: 372,896

[22] Filed: Jun. 28, 1989

[30] Foreign Application Priority Data

Jun. 28, 1988 [JP] Japan .................................. 63-157930
Aug. 15, 1988 [JP] Japan .................................. 63-203005

[51] Int. Cl.⁵ .............................................. H04N 7/12
[52] U.S. Cl. ..................................... 358/133; 358/141; 358/148
[58] Field of Search ............... 358/133, 141, 148, 135, 358/136, 149, 13

[56] References Cited

U.S. PATENT DOCUMENTS 4,402,010 8/1983 Vogelman ............................ 358/133
4,420,771 12/1983 Pirsh .................................. 358/133 X
4,731,664 3/1988 Nishiwaki et al. ................... 358/133
4,831,439 5/1989 Fedele et al. ....................... 358/133

Primary Examiner—Victor R. Kostak
Attorney, Agent, or Firm—Ostrolenk, Faber, Gerb & Soffen

[57] ABSTRACT

In a decoding system for decoding video signals into original video signals, the requirement for an externally-arranged frame synchronizer is avoided. The decoding system itself incorporates a frame synchronization function. In one form, the decoding system comprises a buffer memory for temporarily storing video signals that have coded by a predetermined coding algorithm. A frame sync signal detector detects frame sync signals out of the video signals temporarily stored in the buffer memory and generates sync detection signals. A reference sync signal detector detects reference sync signals provided from outside and generates reference sync detection signals. A decoder is responsive to the frame sync and reference sync detection signals to read the video signals out of the buffer memory and to decode the video signals.

8 Claims, 8 Drawing Sheets

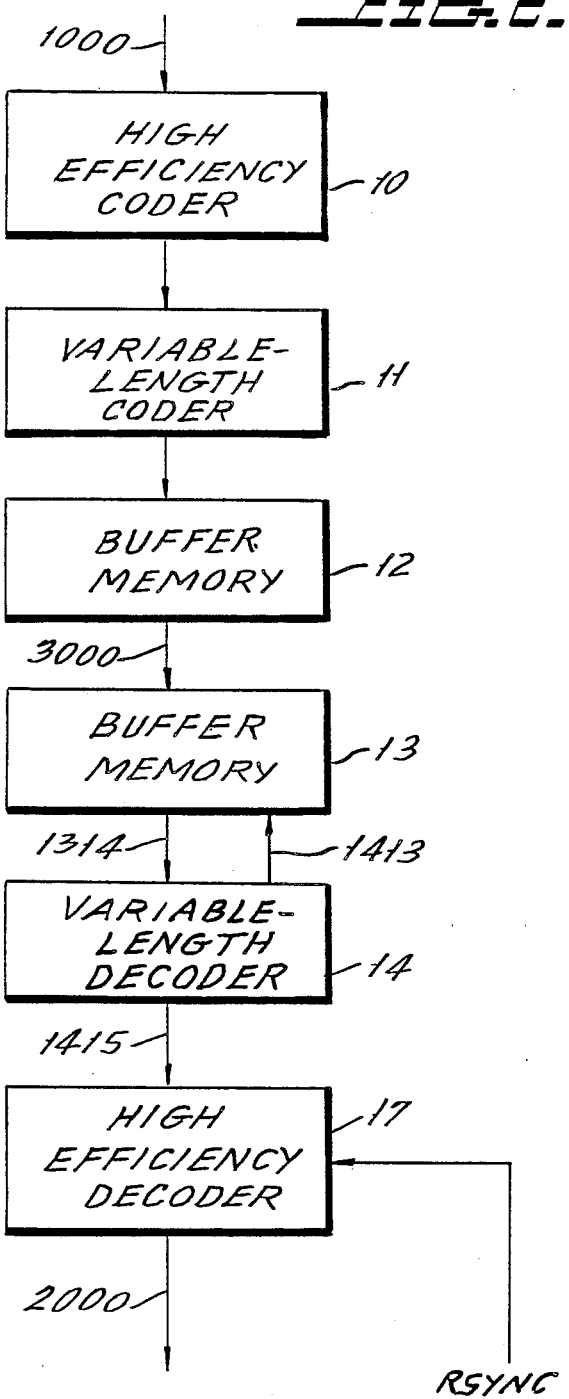

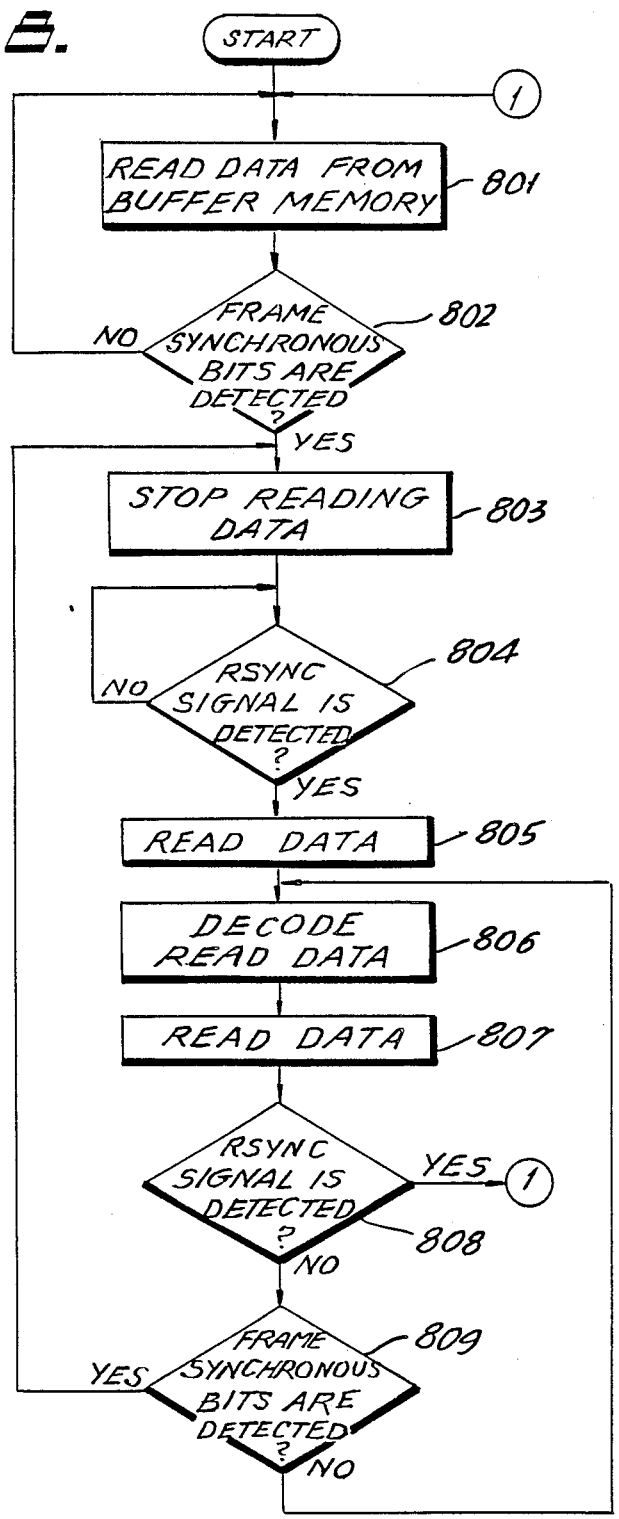

VIDEO SIGNAL DECODING SYSTEM HAVING A FRAME SYNCHRONIZER FUNCTION

BACKGROUND OF THE INVENTION

The present invention relates to a decoding system for decoding coded video signals into original video signals, and more particularly to a decoding system for video signals that have undergone high-efficiency encoding.

One of the prior art methods for efficient transmission of video signals, including moving picture signals, is to encode the original video signals by using bandwidth compression techniques and to reproduce the video frame by decoding the encoded signals on the receiving side. In this arrangement, in order to reproduce the video frame by synchronizing the decoded video signals with the reference sync signal on the receiving side for video signal processing, a frame synchronizer is provided following the decoder.

The frame synchronizer, however, because of its high cost and bulkiness, involves the problem of requiring larger hardware for the decoding system.

SUMMARY AND OBJECTS OF THE INVENTION

An object of the present invention, therefore, is to provide a decoding system for decoding coded video signals in synchrony with a reference sync signal, which has a simple configuration and which does not require an expensive frame synchronizer as in the above prior art.

A decoding system according to the invention dispenses with an externally-arranged frame synchronizer by incorporating the function of the frame synchronizer into the decoding system itself. Such decoding system for decoding coded video signals coded by a predetermined coding algorithm, and supplying decoded video signals, comprises a buffer memory for temporarily storing the coded video signals. A frame sync signal detector detects frame sync signals out of the video signals temporarily stored in the buffer memory and generates sync detection signals. A reference sync signal detector detects reference sync signals provided from outside and generates reference sync detection signals. A decoder is responsive to the frame sync and reference sync detection signals to read the video signals out of the buffer memory and to decode the video signals.

BRIEF DESCRIPTION OF THE DRAWINGS

The above and other objects, features and advantages of the present invention will become more apparent from the following detailed description when taken in conjunction with the accompanying drawings, in which:

FIG. 2 is a block diagram illustrating a video signal transmission system using a first preferred embodiment of the invention;

FIG. 4 is a block diagram illustrating the details of the predictor 22 in FIG. 3a;

FIG. 8 is a flow chart for describing the operation of the variable-length decoder shown in FIG. 7.

DETAILED DESCRIPTION OF THE PREFERRED EMBODIMENTS

Figure 1:
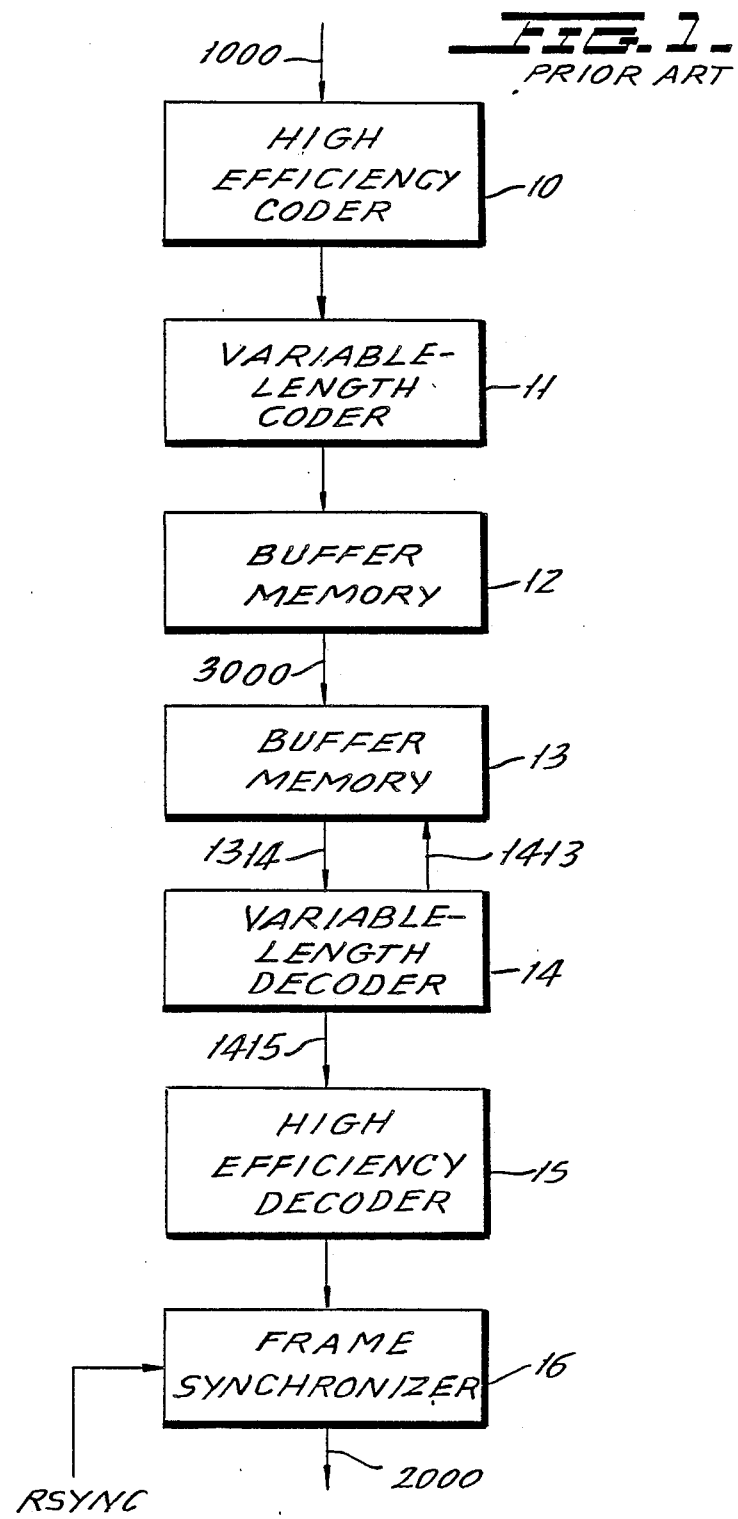
FIG. 1 is a block diagram illustrating a video signal transmission system of the prior art.

In order to facilitate comprehension of the present invention, the prior art will be described first. FIG. 1 is a block diagram illustrating a video signal transmission system of the prior art. A video signal fed to a high-efficiency coder 10 via line 1000 is coded by a high-efficiency coding algorithm, such as predictive coding, and supplied to a variable-length coder 11. The coded video signal is variable-length coded into a variable-length (VL) coded video signal, for instance a Huffman code, by the VL coder 11. The VL coded video signal, after being matched to the data transmission speed of a transmission line 3000 by a buffer memory 12, is outputted to the transmission line 3000. Another buffer memory 13 temporarily stores the VL coded video signal received via the transmission line 3000, and outputs stored video signal to a line 1314 in accordance with a read request signal received from a VL decoder 14 via line 1413. The VL decoder 14 variable-length decodes the stored video signal read out of the buffer memory 13, and provides the VL decoded video signal to a high-efficiency decoder 15. The high-efficiency decoder 15 achieves decoding based on the method of coding accomplished by the high-efficiency coder 10 to decode VL decoded signal into the decoded video signal. The decoded video signal is synchronized by a frame synchronizer 16 with a reference sync signal (RSYNC) supplied from outside and outputted to a line 2000. This system illustrated in FIG. 1, which includes the frame synchronizer 16, involves the aforementioned problem of necessitating bulky hardware.

FIG. 2 is a block diagram illustrating a video signal transmission system using a first preferred embodiment of the invention. This system shown in FIG. 2 is identical with that in FIG. 1 except that the RSYNC is supplied to a high-efficiency decoder 17 and there is no frame synchronizer used.

Figure 3A:
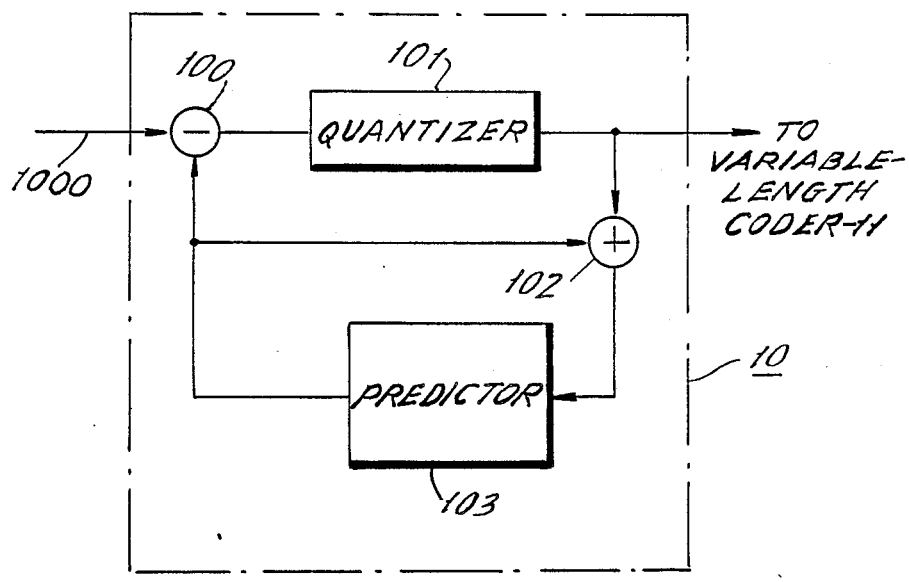
FIG. 3a is a block diagram illustrating an example of the high-efficiency coder 10 in FIG. 2.
Figure 3B:
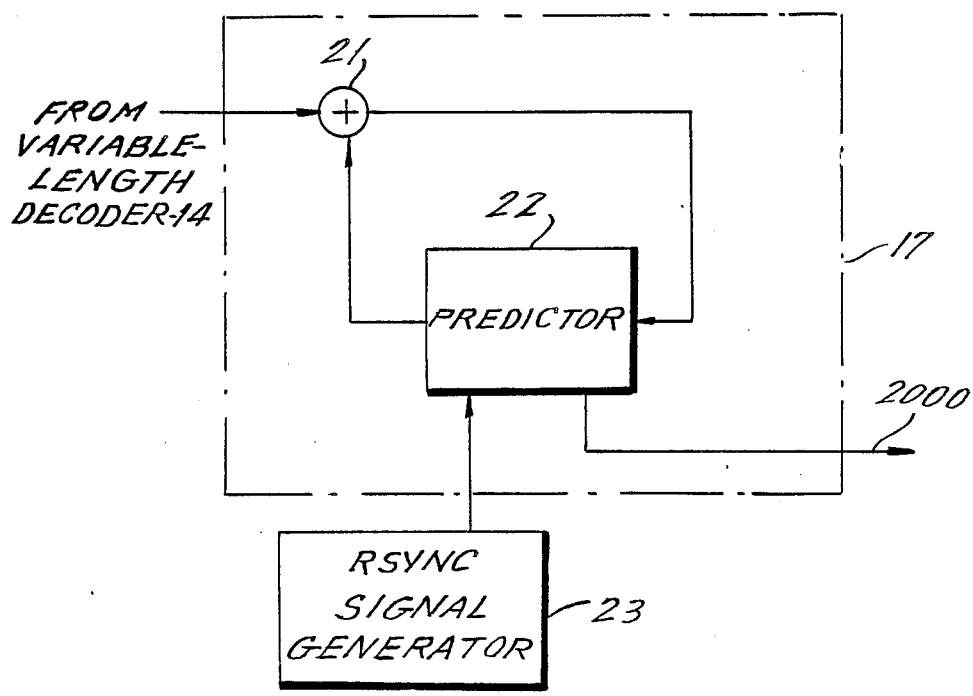
FIG. 3b is a block diagram illustrating an example of the high-efficiency decoder 10 in FIG. 2.

FIGS. 3a and 3b are block diagrams illustrating a case in which a predictive coding/decoding altorithm is adapted to be embodied respectively in the high-efficiency coder 10 and the high-efficiency decoder 17 of FIG. 2. Referring to FIG. 3a, a video signal entered via the transmission line 1000 is deprived, by a subtractor 100, of a predictive signal supplied by a predictor 103, and the prediction error is fed to a quantizer 101. The quantizer 101 quantizes and codes the error signal, and supplies the coded error signal to both the VL coder 11 (FIG. 2) and an adder 102. The adder 102 enters into the predictor 103 the result of the addition of the predictive signal, already supplied from the predictor 103, and the coded error signal. The predictor 103 generates a predictive signal on the basis of predetermined predictive characteristics. By way of example, the predictor 103 may be an interframe predictor using a single-frame delay element. As the coding algorithm so far described is known to those skilled in the art as an interframe predictive coding algorithm, any further description of predictor 103 is omitted.

The decoder 17 corresponding to the coder 10 of FIG. 3a has the configuration illustrated in FIG. 3b, and adds, with its adder 21, a predictive signal supplied from a predictor 22 having the same predictive characteristics as the predictor 103 of the coder 10 (interframe prediction) and the VL decoded video signal from the VL decoder 14. The result of this addition, i.e. the decoded video signal, is entered into the predictor 22 to be used as the predictive signal afterwards. Meanwhile, the predictor 22 responds to the RSYNC from a reference sync signal generator 23, to produce a synchronized video signal, which is in synchronism with the RSYNC, to the signal line 2000. A specific example of configuration of the predictor 22 is illustrated in FIG. 4.

Figure 4:
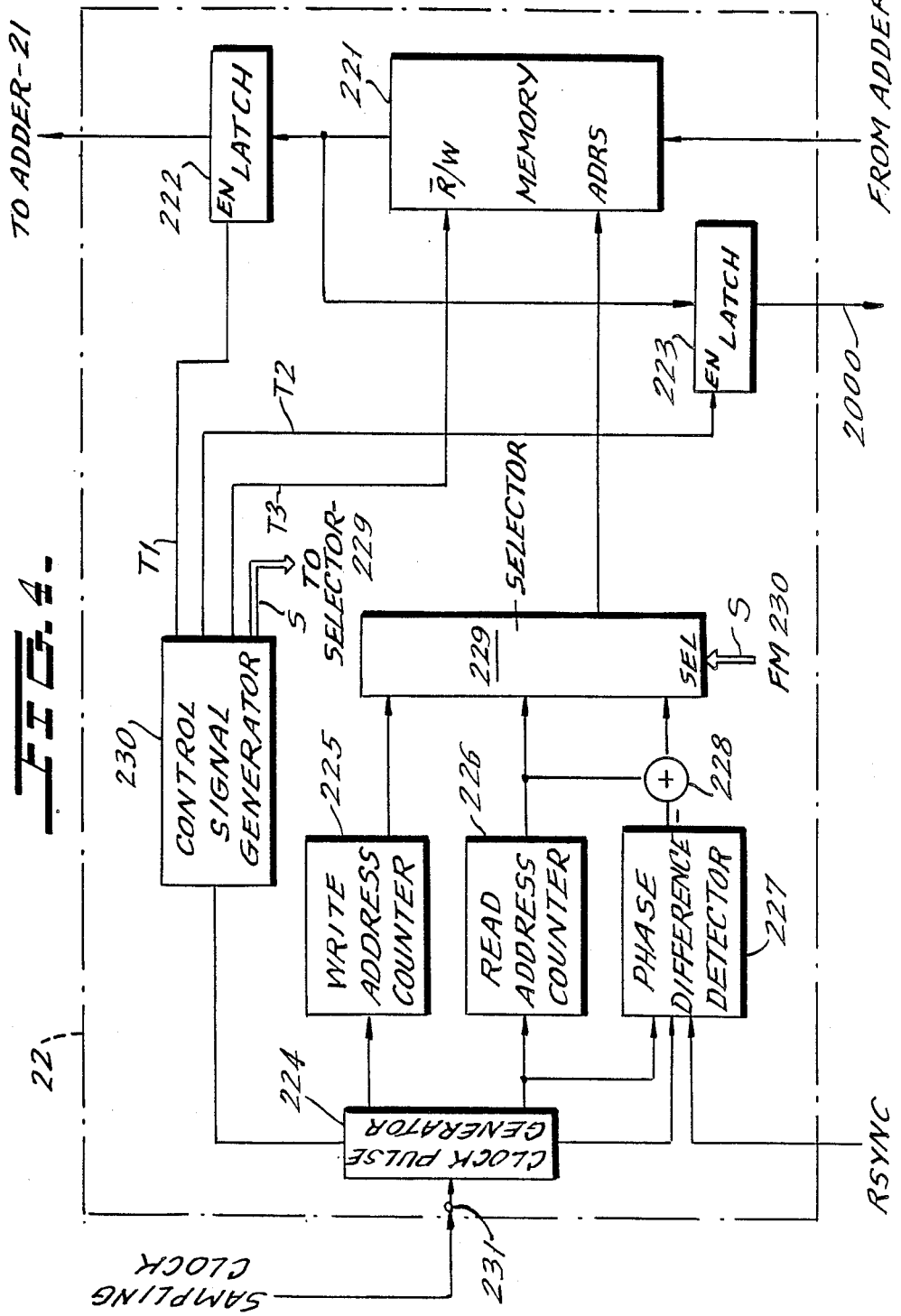

Referring to FIG. 4, the predictor 22 comprises a memory 221 having a single-frame capacity (=N) for instance, a first latch 222 for feeding a decoded video signal read out of the memory 221 to the adder 21 as the predictive signal, and a second latch 223 for supplying on line 2000 the same signal as the synchronized video signal in synchronism with the RSYNC. A write address counter (WAC) 225 and a read address counter (RAC) 226, both N-ary counters for instance, are respectively supplied with first and second clock pulses having a sampling frequency from a clock pulse generator 224, and output a write address and a first read address for reading the predictive signal into the memory 221. The clock pulse generator 224 generates various clock pulses described latter, in response to a sampling clock pulse applied to a terminal 231, which is generated in a sampling clock pulse generator (not shown). A phase difference detector (PDD) 227 detects the phase difference between an internal sync signal (ISYNC) obtained by N-frequency-dividing second clock pulses and the RSYNC, and outputs an offset value corresponding to the phase difference. A subtractor 228 subtracts the offset value from the first read address, and generates a second read address for reading the decoded video signal in synchronism with the RSYNC. A selector 229 selects one out of the write address and the first and second read addresses from selecting signals fed from a control signal generator 230, and supplies the address to the address terminal of the memory 221. The control signal generator 230 provides control signal T1 to T3 to the first and second latches 222 and 223 and the memory 221, respectively, and at the same time supplies the selecting signals to the selector 229.

In order to use the memory 221 as a single-frame delay element, the clock pulse signal generator 224 so performs that a difference of N clock pulses always exists between the value of the WAC 225 and that of the RAC 226. More specifically, this can be achieved by first supplying the WAC 225 with the first clock pulses and starting to feed the second clock pulses, which is the same frequency as the first clock pulse signal, to the RAC 226 when the value of the WAC 225 is N−1. While counting up the WAC 225, decoded video signal writing into the memory 221 is carried out.

Meanwhile the PDD 227 can be composed of a counter which starts counting up the second clock pulses from a rising edge of the ISYNC and is reset with the RSYNC, and a memory. Thus, since the value immediately before the resetting of the counter by the inputting of the RSYNC corresponds to the offset value of the read address corresponding to the phase difference between the ISYNC and the RSYNC, the video signal in synchronism with the RSYNC can be outputted by reading the video signal of an address resulting from the subtraction by the subtractor 228 of the offset value from the value of the RAC 226. At this time, as the memory address has no negative value, the address immediately below the smallest address is treated as the greatest address.

The selector 229 is a selector which outputs one of four inputs in response to a two-bit selecting signal, for instance, and in this preferred embodiment the control signal generator 230 so supplies a selecting signal that the selector 229 periodically selects from three different address inputs. Now supposing that the first read address, second read address and write address are selected in response to two-bit selecting signals "01", "10" and "11", respectively; the control signal generator 230 will have only to generate selecting signals "01", "10" and "11".

Figure 5:
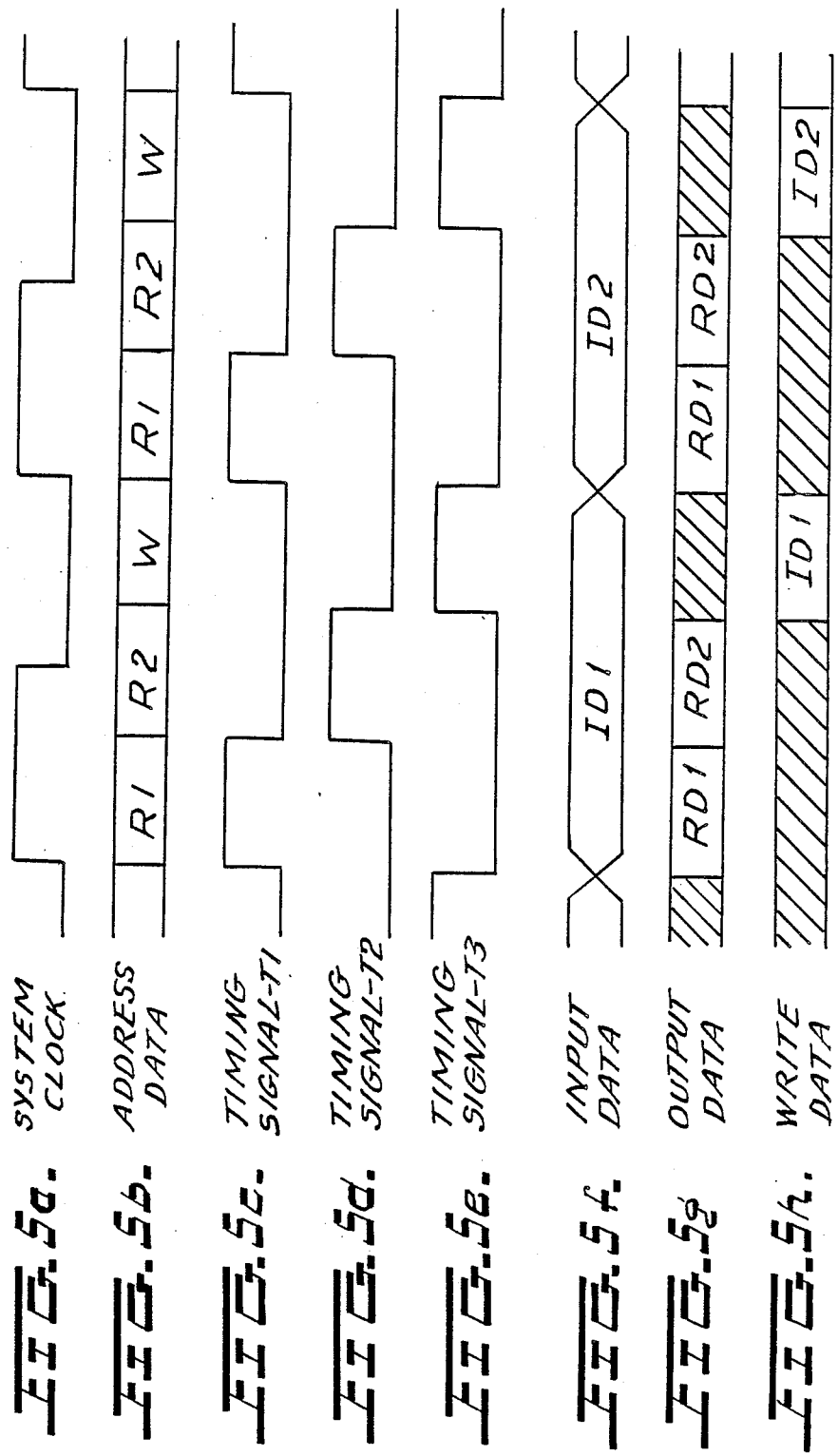
FIGS. 5a–5h are time charts for describing the operation of the predictor 22 shown in FIG. 4.

FIGS. 5a to 5h are timing charts for explaining the operation of the predictor 22 shown in FIG. 4. The decoding system operates in accordance with the system clock pulses which have the same frequency as the sampling clock pulses shown in FIG. 5a. In this preferred embodiment, the memory 221 is accessed three times in each cycle of the system clock pulses in accordance with the first to third timing signals T1 to T3 supplied by the control signal generator 230. If the sequence of the three memory accesses is, for example, (1) reading a stored video signal as the predictive signal, (2) reading a stored video signal in synchronism with the RSYNC and (3) writing of the decoded video signal from the adder 21; the control signal generator 230 will supply the enable terminals of the first and second latches 222 and 223 and the read/write mode selecting terminal of the memory 221 with the first to third timing signals T1 to T3 each having waveforms which assume the logical "1" level for ⅓ of the system clock cycle as shown in FIGS. 5c to 5e. The control signal generator 230, along with the generation of the first to third timing signals T1 to T3, so supplies a selecting signal to the selector 229 as to make it select addresses in the sequence shown in FIG. 5b, wherein the first read address is represented by R1, the second read address by R2 and the write address by W. Incidentally, in this embodiment, the memory 221 is supposed to be in the write state when the level of the signal fed to the read/write state selecting terminal is logical "1", and in the read state when the signal level is logical "0". As a result, a decoded video signal RD1 (FIG. 5g) as the predictive signal read out in response to the first read address R1 is taken into the first latch 222 which is brought into the enable state by the first timing signal T1, and supplied to the adder 21. When the first timing signal T1 shifts to the logical "1" level, the second timing signal T2 changes to the logical "1" level; at the same time the selector 229 selects the second read address R2, and the corresponding decoded video signal RD2 (FIG. 5g) is taken into the second latch 223 enabled by the second timing signal T2 and supplied outside as a synchronized video signal in synchronism with RSYNC. Then, when the second timing signal T2 shifts to logical "0", the third timing signal T3 changes to logical "1". This brings the memory 221 into the write state, an input decoded video signal ID1 (FIG. 5f) from the adder 21 (FIG. 3b) is written into the memory 221 in response to the write address W selected by the selector 229. These operations are repeated thereafter.

Thus, by using the memory normally employed as a delay element also for absorbing the phase difference between the ISYNC and the RSYNC, a phase difference corresponding to the maximum delay of the memory can be absorbed to dispense with a frame synchronizer. Whereas high-speed access to the memory is required in this preferred embodiment, the requirement is not so stringent as to limit the choice of the memory element and, if the speed does pose a problem, the problem can still be readily solved by a technique well known to those skilled in the art, such as arranging memories in parallel.

Figure 6:
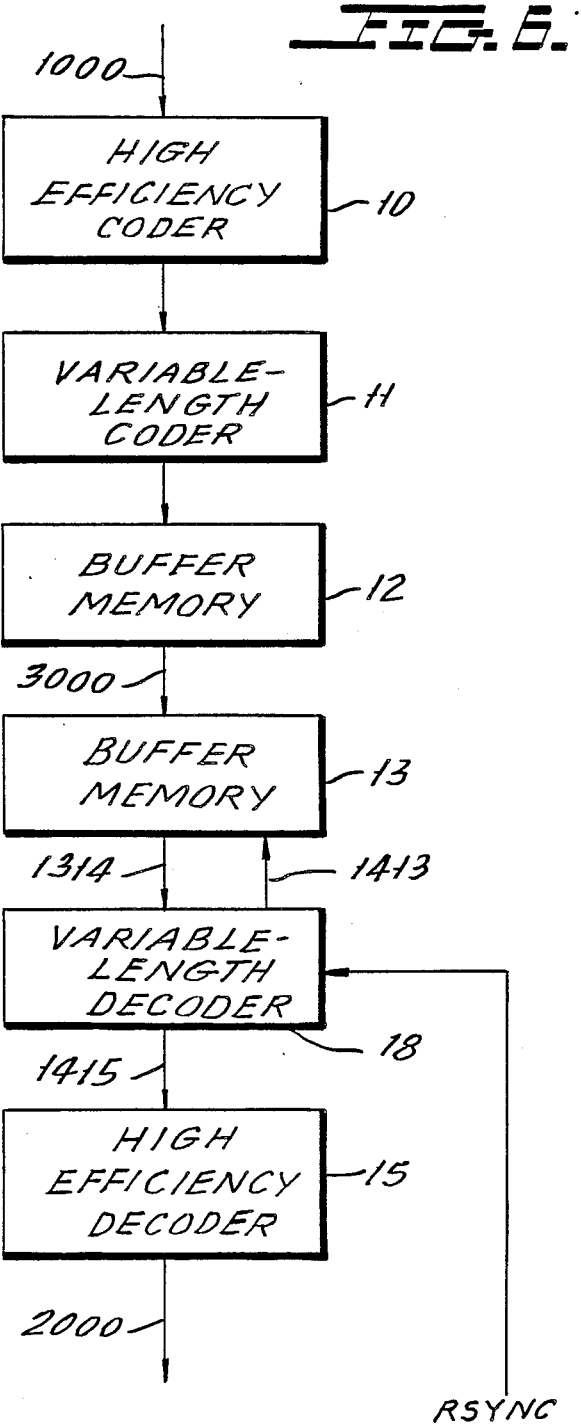
FIG. 6 is a block diagram illustrating a video transmission system using a second preferred embodiment of the invention.

FIG. 6 is a block diagram illustrating a video transmission system using another preferred embodiment of the invention.

The embodiment illustrated in FIG. 6 is characterized in that the RSYNC is entered into a variable-length (VL) decoder 18 instead of the high efficiency decoder 15, and the VL decoded output is synchronized with the RSYNC. As constituent elements other than the variable-length decoder 18 are the same as the corresponding ones in the prior art system of FIG. 1, this element alone will be be described below.

Figure 7:
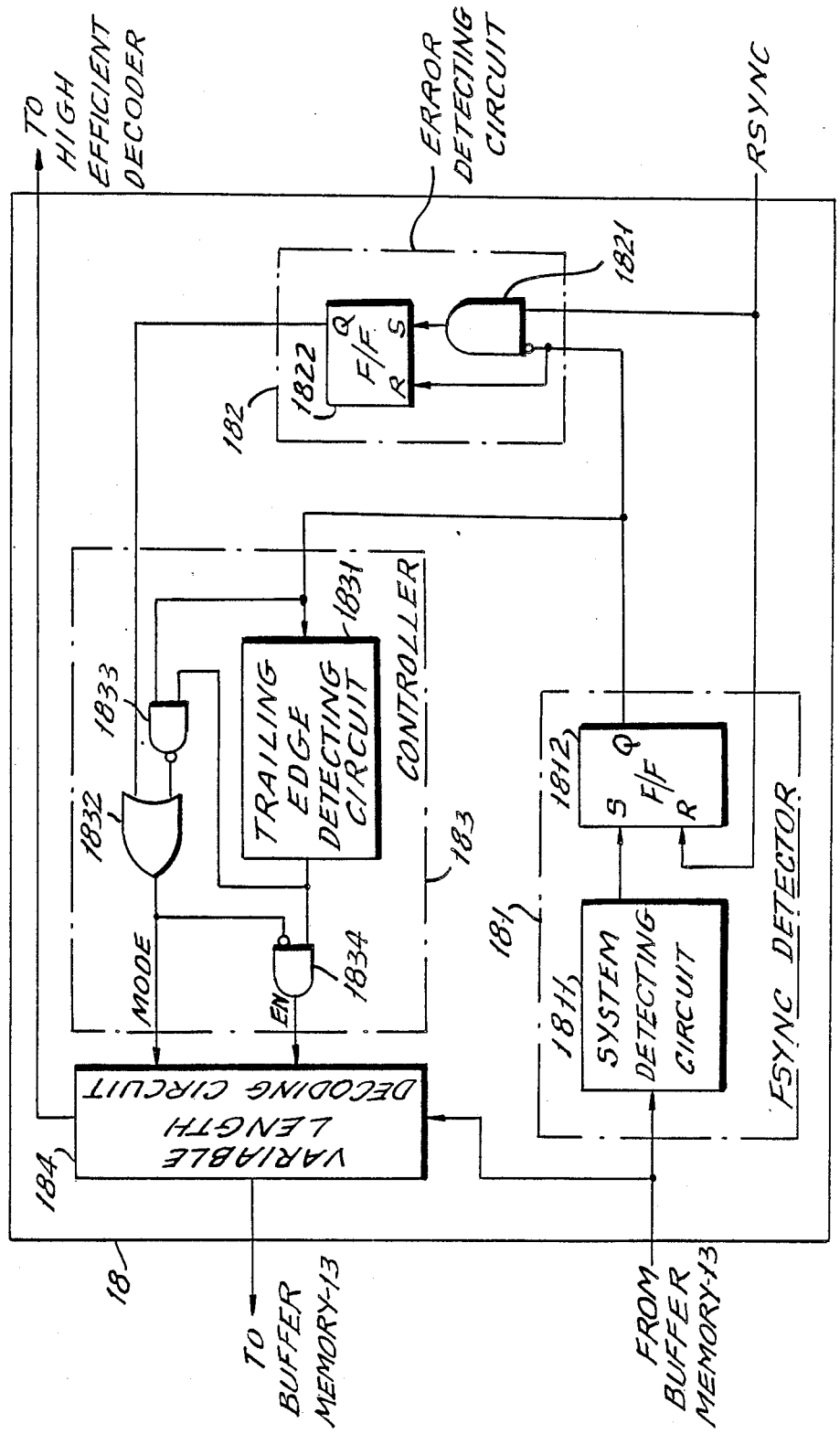
FIG. 7 is a block diagram illustrating an example of the variable-length decoder 18 in FIG. 6.

FIG. 7 illustrates a specific example of circuitry for the VL decoder 18, and FIG. 8 is a flow chart showing its operation. This preferred embodiment presupposes a shorter frame synchronization cycle than a reference synchronization cycle. Referring to FIG. 7, the VL decoder 18 comprises a frame sync detector 181 for detecting a frame sync signal (FSYNC) from the video signal read out of the buffer memory 13 and outputting a FSYNC detection signal; an error detecting circuit 182 for detecting the cyclic relationship between the aforementioned frame synchronization and reference synchronization on the basis of the RSYNC and the frame sync detection signal, and for generating an error detection signal; a controller 183 responsive to the FSYNC detection signal and the error detection signal for supplying control signals to a VL decoding circuit 184; and the VL decoding circuit 184 for decoding in accordance with the control signals from the controller 183. The VL decoding circuit 184 having this configuration operates as shown in Table 1 in response to a read mode signal (MODE signal) and an enable signal (EN signal), which are first and second control signals, respectively, generated by the controller 183.

TABLE 1

| EN signal | 0: Decoding not performed. |
|---|---|
| | 1: Decoding performed. |
| MODE signal | 0: Reading accompanies decoding. |
| | 1: Idle reading until the MODE signal turns "0". |

In the initial state, as the FSYNC is not yet detected, the FSYNC detection signal which is the output of the FSYNC detector 181 is at the logical "0" level. The FSYNC detection signal of the logical "0" is fed to one of the inputs of a NAND gate 1833 and a trailing edge detecting (TED) circuit 1831 in the controller 183. The other input of the NAND gate 1833 is connected to the output of the TED circuit 1831. The TED circuit 1831 outputs a trailing edge detecting (TED) signal of the logical "1" when the FSYNC detection signal changes from the logical "1" to the logical "0" level and one of the logical "0" when the FSYNC detection signal changes from the logical "0" to the logical "1" level. Consequently, TED circuit 1831 outputs a signal of the logical "0" level in the initial state. The NAND gate 1833 receives two inputs of the logical "0" level and provides an output signal having the logical "1" level. This signal is fed to one of the inputs of an OR gate 1832 to make the level of the MODE signal logical "1". Whereas the error detection signal from the error detector 182 is fed to the other input of the OR gate 1832, the error detection signal is logical "0" at this time. Meanwhile, the EN signal which is the output of an AND gate 1834, having an inverted MODE signal and the TED signal as its inputs, is logical "0", and the variable-length decoding circuit 184 performs idle reading as shown in Table 1, but does not decode the video signal which has been read out (FIG. 8: a loop of steps 801 and 802). When the FSYNC is detected from the video signal idly read out of the buffer memory 13, an FSYNC detecting circuit 1811 in the FSYNC detector 181 sets a first flip-flop (F/F) 1812, and the level of the FSYNC detection signal changes to logical "1". As a result, the output of the NAND gate 1833 turns logical "0" and, as the error detection signal remains logical "0", the MODE signal changes to logical "0" to discontinue the idle reading (FIG. 8: step 803). Meanwhile, the EN signal also is logical "0" because the TED signal remains unchanged at logical "0", nor does decoding take place. When the RSYNC is inputted in this state (FIG. 8: step 804), the RSYNC resets the first F/F 1812 of the FSYNC detector 181, and the FSYNC detection signal changes from logical "1" to logical "0". This change is detected by the TED circuit 1831, and the TED signal turns logical "1". This change causes the AND gate 1834 to be turned ON to make the EN signal logical "1". Meanwhile the MODE signal remains unchanged at logical "0" and, with normal decoding taking place, the variable-length decoding circuit 184 provides the decoded output to the high-efficiency decoder 15 (FIG. 8: steps 805 to 807). The decoding operation is repeated until either the FSYNC or the RSYNC is detected (FIG. 8: steps 806 to 809). If the FSYNC is detected (FIG. 8: step 809), the FSYNC detection signal will change to logical "1" and, along with that, the TED signal turns logical "0", so that both control signals, MODE and EN, will assume the logical "0" level, and the process returns to step 803 to wait for the RSYNC to come. The operation so far described is repeated thereafter. Meanwhile, if the RSYNC is detected before the FSYNC is detected (FIG. 8: step 808), the RSYNC will pass an AND gate 1821, one of whose inputs is an inverted FSYNC detection signal, of the error detector 182 (the level of the FSYNC detection signal is logical "0" during the decoding operation), to set a second F/F 1822. As a result, the error signal will turn logical "1" to return the process to step 801 by changing the MODE signal to logical "1" via an OR gate 1832 and, at the same time, turning off the AND gate 1834 to change the EN signal to logical "0". The operation so far described will be repeated thereafter.

Thus, in the second preferred embodiment of the present invention, variable-length decoded signals can be synchronized with reference signals without having to use a frame synchronizer by starting variable-length decoding upon establishment of both frame synchronization and reference synchronization.

As hitherto described the present invention makes it possible to realize a video signal decoding system requiring no special frame synchronizer by providing a predictive coder, which uses a decoded video signal delaying element within a predictor for predictive encoding, for the dual purposes of generating predictive signals and correcting the phase difference between reference sync signals and decoded video signals; or uses a coder which employs a buffer memory for the reception of coded video signals, usually employed in a decoding system, as a phase difference correcting circuit and starts decoding upon detection of both frame synchronism and reference synchronism.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A decoding system for a coded video signal, coded in accordance with a predetermined coding algorithm, comprising:
   receiving means for receiving said coded video signal and supplying a received video signal; and
   decoding means for decoding said received video signal,
   said decoding means being supplied with an external reference sync signal supplied from outside of said decoding system, said decoding means being effective for decoding said received video signal using a decoding algorithm corresponding to said predetermined coding algorithm and for producing a synchronized decoded signal synchronized with said reference sync signal.

2. A decoding system as claimed in claim 1, wherein said decoding algorithm is a predictive decoding algorithm using a predictor having a predetermined predictive characteristic for producing a predictive signal.

3. A decoding system as claimed in claim 2, wherein said predictor comprises:
   first delaying means for delaying said decoded signal by a first predetermined delay to output said predictive signal; and
   second delaying means for delaying said decoded signal by said first delay and by a second delay determined by said reference sync signal so as to output said synchronized decoded signal in synchronism with said reference sync signal.

4. A decoding system as claimed in claim 3, wherein:
   said first delaying means comprises memory means having a predetermined capacity for storing said decoded signal and means for giving the memory means a write address and a read address having a difference corresponding to said first delay; and
   said second delaying means comprises phase difference detecting means for detecting the phase difference between said read address and said reference sync signal, and phase difference correcting means for correcting said read address in response to said phase difference and supplying a corrected read address to said memory means.

5. A video signal decoding system for decoding a coded video signal coded by a predetermined coding algorithm, and for producing a decoded video signal comprising:
   buffer memory means for temporarily storing said coded video signal;
   frame sync signal detecting means for detecting a frame sync signal out of said coded video signal temporarily stored in said buffer memory means and generating a sync detection signal;
   reference sync signal detecting means for detecting a reference sync signal provided from outside and generating a reference sync detection signal; and
   decoding means responsive to said frame and reference sync detection signals for reading said coded video signals out of said buffer memory means, decoding said coded video signal and supplying said decoded signal.

6. A decoding system for video signals, as claimed in claim 5, wherein said decoding means comprises:
   means for suspending the whole decoding operation upon detection of said frame sync signal; and
   means for restarting said suspended decoding operation upon detection of said reference sync signal during the suspension of the operation.

7. A decoding system for a variable-length coded video signal obtained by variable-length coding a predictive coded video signal, comprising:
   buffer memory means for temporarily storing the variable-length coded video signal;
   variable-length decoding means for reading the variable-length coded video signal from the buffer memory means and variable-length decoding said variable-length coded video signal into said predictive coded video signal; and
   predictive decoding means, having predictor means, for predictive decoding said predictive coded video signal into a decoded video signal, said predictor means responding to a reference sync signal supplied from outside to produce a synchronized decoded video signal in synchronism with the reference sync signal.

8. A decoding system for a variable-length coded video signal obtained by variable-length coding a predictive coded video signal, comprising:
   buffer memory means for temporarily storing the variable-length coded video signal;
   variable-length decoding means for reading the variable-length coded video signal from the buffer memory means and variable-length decoding said variable-length coded video signal into said predictive coded video signal in synchronism with a reference sync signal supplied from outside; and
   predictive decoding means for predictive decoding said predictive coded video signal from the variable-length decoding means into a decoded video signal.

* * * * *